US009539795B2

(12) United States Patent
Oscar et al.

(10) Patent No.: US 9,539,795 B2
(45) Date of Patent: Jan. 10, 2017

(54) MATTE SUBSTRATE

(75) Inventors: Dennis J. Oscar, West Bend, WI (US); Charles J. Wasserman, Waukesha, WI (US)

(73) Assignee: ASHLAND LICENSING AND INTELLECTUAL PROPERTY LLC, Wilmington, DE (US)

( * ) Notice: Subject to any disclaimer, the term of this patent is extended or adjusted under 35 U.S.C. 154(b) by 645 days.

(21) Appl. No.: 12/534,950

(22) Filed: Aug. 4, 2009

(65) Prior Publication Data

US 2010/0035026 A1 Feb. 11, 2010

Related U.S. Application Data

(60) Provisional application No. 61/188,214, filed on Aug. 7, 2008.

(51) Int. Cl.
| | | |
|---|---|---|
| B32B 33/00 | (2006.01) | |
| C09D 175/04 | (2006.01) | |
| D21H 19/36 | (2006.01) | |
| C09D 5/02 | (2006.01) | |
| C09D 7/00 | (2006.01) | |
| B32B 37/00 | (2006.01) | |
| B32B 37/24 | (2006.01) | |
| B41M 5/50 | (2006.01) | |
| B41M 5/52 | (2006.01) | |
| C08K 3/00 | (2006.01) | |
| C08K 5/3412 | (2006.01) | |

(52) U.S. Cl.
CPC .............. *B32B 33/00* (2013.01); *C09D 5/028* (2013.01); *C09D 7/005* (2013.01); *C09D 175/04* (2013.01); *D21H 19/36* (2013.01); *B32B 37/0015* (2013.01); *B32B 2037/243* (2013.01); *B32B 2307/408* (2013.01); *B32B 2429/00* (2013.01); *B41M 5/508* (2013.01); *B41M 5/5218* (2013.01); *B41M 5/5254* (2013.01); *B41M 5/5281* (2013.01); *C08K 3/0033* (2013.01); *C08K 5/3412* (2013.01); *Y10T 428/24802* (2015.01); *Y10T 428/266* (2015.01); *Y10T 428/28* (2015.01); *Y10T 428/31678* (2015.04); *Y10T 428/31725* (2015.04); *Y10T 428/31786* (2015.04); *Y10T 428/31855* (2015.04); *Y10T 428/31989* (2015.04); *Y10T 428/31993* (2015.04)

(58) Field of Classification Search
CPC ...................................... C09D 175/04
See application file for complete search history.

(56) References Cited

U.S. PATENT DOCUMENTS

| | | | |
|---|---|---|---|
| 4,048,366 A * | 9/1977 | Kingsbury | 428/215 |
| 5,626,969 A | 5/1997 | Joson | |
| 5,707,722 A * | 1/1998 | Iqbal et al. | 428/32.24 |
| 5,900,457 A * | 5/1999 | Duan et al. | 524/591 |
| 5,952,106 A * | 9/1999 | Schriver et al. | 428/423.5 |
| 7,439,299 B2 | 10/2008 | Coogan et al. | |
| 2003/0112311 A1* | 6/2003 | Naik et al. | 347/105 |
| 2003/0180541 A1* | 9/2003 | Naik et al. | 428/423.1 |
| 2003/0228424 A1* | 12/2003 | Dove et al. | 427/553 |
| 2004/0254292 A1* | 12/2004 | Williams | 524/589 |
| 2005/0288431 A1* | 12/2005 | Gindin et al. | 524/589 |
| 2006/0111538 A1 | 5/2006 | Coogan et al. | |
| 2006/0118988 A1* | 6/2006 | Louw et al. | 264/82 |
| 2007/0269660 A1* | 11/2007 | Killilea et al. | 428/414 |
| 2008/0026151 A1* | 1/2008 | Zhu et al. | 427/327 |

OTHER PUBLICATIONS http://www.coronalab.net/wxzl/energies_polymers.htm.*
http://www.specialchem4coatings.com/news-trends/displaynews.aspx?id=800 (Obtained Feb. 28, 2014).*
International Search Report from corresponding PCT application (PCT/US09/52932).
Neo-Rez R-1010 Technical Information "Water based aliphatic urethane dispersion" DSM NeoResins B.V., Date of Issue Jun. 2007.

* cited by examiner

*Primary Examiner* — Gerard Higgins
*Assistant Examiner* — Sathavaram I Reddy
(74) *Attorney, Agent, or Firm* — Thompson Hine LLP; William J. Davis

(57) ABSTRACT

Matte substrates comprising a water based coating composition and a base substrate. The water based coating composition comprises either no or only small amounts of mineral filler, refractory filler and/or organic filler and no other matting agents. The water based coating composition is typically applied to the base substrate at a coating weight of less than or equal to about 3 dry pounds of the water based coating composition per about 3,000 square feet of the base substrate. The matte substrate generally has a 60° gloss less than about 20.

18 Claims, No Drawings

MATTE SUBSTRATE

CROSS-REFERENCE TO RELATED APPLICATIONS

This application claims the benefit of U.S. Patent Application No. 61/188,214, filed Aug. 7, 2008. U.S. Patent Application No. 61/188,214 is incorporated herein in its entirety by reference.

BACKGROUND OF THE INVENTION

Field of the Invention

The invention pertains to matte substrates comprising water based coating compositions and base substrates. The water based coating composition comprises only small amounts of mineral fillers, refractory fillers and/or organic fillers and may comprise no mineral fillers, refractory fillers or organic fillers. Other matting agents are not used in the invention.

The Related Art

Matte finish, i.e. a dull, no gloss finish having a lack of any or significant luster, is generally achieved by applying a coating material to a substrate. Many different types of substrates can be coated with a material to develop matte finish. One application for such coated substrates is paper stock for books, folders, magazine covers, and coated paper board for containers. Another example is paper that is coated to create matte finish photo paper and printer paper. Matte finishes are also used is in the area of labels, such as package labels.

Matte finish coatings are typically based on polymer resins as the binder and require the use of mineral, refractory and/or organic fillers, or other fillers as agents to lower the gloss. In the prior art, more than 1.0% mineral, refractory or organic fillers, and possibly other fillers, are needed to obtain a matte finish. Matte substrates made with mineral, refractory, organic or other fillers, such as those having more than 1.0% mineral, refractory or organic fillers, and/or other fillers, have disadvantages. These disadvantages include burnish and relatively poor scratch and rub resistance. Burnish resistance and scratch and rub resistance tends to decrease as the gloss of the coated substrate decreases. Moreover, the scratches and burnish marks do not heal such that once the matte substrate is burnished or scratched the wounds are permanent which is particularly disadvantageous when the matte substrate is used for book, folder, and magazine covers or in labeling applications. Further, the coatings in the art are typically high density and, after application to the substrate, cause curl in the coated matte substrate or film which is disadvantageous. Also, films or substrates coated with the conventional materials do not have the desired soft touch feel.

Liquid mineral filled coatings have low solids content and typically at least 12 wet pounds of coating per 3,000 square feet of substrate needs to be applied to achieve a 60° gloss less than 20. Coating at these loadings takes a lot of energy to dry off the volatile material and, also, it takes a lot of heat to laminate these films to another substrate due to heat capacity and heat sink effect of the high loading of mineral fillers.

Further disadvantages include negative effects on processing equipment. For example, conventional films comprising mineral filled matte coatings, such as coatings comprising more than 1.0% mineral, refractory or organic fillers, and/or other fillers, dull the knives that are used to slit the master rolls of coated film down to the correct size. Further, in laminated applications the films comprising conventional material dull the knives used to cut off the films during the lamination step.

In certain applications, use of ultraviolet ("UV") curable topcoats to the matte substrates is desirable. Such top coating materials do not have excellent adhesion to the conventional mineral filled low gloss coatings, including coatings comprising mineral, refractory, organic or other fillers, including coatings comprising more than 1.0% of such fillers.

Coatings made according to the prior art applied various polymeric binders such as acrylic, polyester, nitrocellulose, melamine, polyurethane and others. The low gloss is achieved by the addition of mineral, refractory or organic fillers and/or other matting agents such as nylon, polyurethane, acrylic, methacrylate, wax based powders, carbodiimide, and the like. Coated low gloss substrates available in the art include a coated low gloss polyamide film, EMBLEM™ 1200M, from Honeywell, Morris Township, N.J., U.S.A., low gloss co-extruded films, films that are produced by chemical laser or mechanical etching, and films that are made low gloss by having a rough pattern embossed in them by heat and/or pressure.

The coating formulations and processes described herein and the matte substrates of the invention comprising such formulations do not have the disadvantages of compositions and substrates in the art. The water based coating composition comprising a water base, such as a polyurethane dispersion, an acrylic dispersion and combinations or reaction products thereof, with a cross-linking agent and optional binder can be applied to a base substrate to create a matte substrate without the use of any or significant matting agents. For example, the compositions may comprise up to about 1.0% mineral filler, refractory filler and/or organic filler or no mineral, refractory or organic fillers, and no other matting agent and achieve a matte finish without the drawbacks associated with compositions in the art.

All parts and percentages set forth in this specification and the claims are on a weight-by-weight basis (wet) unless noted otherwise.

SUMMARY OF THE INVENTION

The matte substrates comprise the water based coating composition and base substrate material. Typically, the water based coating composition comprises a water base, one or more cross-linking agents and optionally one or more binders. The water based coating composition will comprise relatively low amounts, if any, of mineral fillers, refractory fillers and/or organic fillers, such as up to about 1%, including up to 1%, mineral fillers, refractory fillers and/or organic fillers, and preferably less than about 0.5% of such fillers, and no other matting agents. In embodiments, the water based coating composition is essentially free of mineral fillers, refractory fillers and organic fillers and may comprise no mineral fillers, refractory fillers and organic fillers and does not contain other matting agents. The water based coating composition may further comprise flow promoters, adhesion promoters or gloss enhancers and the like, and combinations thereof.

The base substrate may be chosen from a variety of materials depending on the application for the matte substrate. For example, the base substrate may be selected from the group consisting of polyamide, polyester, polypropylene, polyethylene, polyvinyl chloride (PVC), styrene, foil, and combinations thereof. The water based coating composition may be applied to the base substrate by typical graphic arts application methods. The coating material is applied to the base substrate at rates (i.e. coating weights) less than or equal to about 9 wet pounds (3 dry pounds) of water based coating composition per about 3,000 square feet of base substrate. The matte substrate preferably has a 60° gloss of less than about 20.

The matte substrate may be applied in a variety of applications and may be laminated to other materials to make articles. In embodiments, the matte substrate can be used as an over laminate applied to book covers, magazine covers, folder covers and the like.

DETAILED DESCRIPTION OF THE INVENTION

The water base is typically selected from the group consisting of a polyurethane dispersion, an acrylic dispersion, a blend of polyurethane dispersion and acrylic dispersion, a copolymerized reaction product of a polyurethane dispersion and an acrylic dispersion and the like and combinations thereof. The polyurethane dispersion may be a water based aliphatic urethane dispersion.

Preferred polyurethane dispersions are those with carboxyl or sulfonate functionality, typically those containing dimethylol propionic acid or diamino sulfonic acid or their salts, that are free or substantially free of N methyl pyrrolidone, such as having less than about 2% of N methylpyrrolidone, for example from about 0.01% to about 2% N methylpyrrolidone. Examples of polyurethane dispersions that may be used include NEOREZ® resins available from DSM NeoResins B. V., Waalwijk, The Netherlands ("DSM"), including NEOREZ® R-1010 and NEOREZ® R-989 and polyurethane dispersions available from Quaker Color, Quakertown, Pa., U.S.A. such as DM-1114.

Examples of acrylic dispersions that may be used in the water based coating composition for the matte substrate include RHOPLEX® K-3 from Dow Chemical Company, Midland, Mich., U.S.A., NEOCRYL® AF-10 from DSM and ACRONAL® A754 and ACRONAL® 8D from BASF, Parsippany, N.J., U.S.A. ("BASF"). Acrylic dispersions useful in the invention may include matte acrylic dispersions, such as NEOCRYL® A2082 Matte Acrylic Dispersion available from DSM, however when matte acrylic dispersions are used the water based dispersion must also comprise at least an acrylic dispersion that does not add matte properties and/or another water base as described herein.

Blends of acrylic dispersion and polyurethane dispersion useful in the invention include WITCOBOND® A-100 from Chemtura Corporation, Middlebury, Conn., U.S.A. Examples of useful copolymerized reaction products include Hydridur 870 from Air Products and Chemicals Inc., Allentown, Pa., U.S.A. and Polymer R4370 from Essential Industries, Merton, Wis., U.S.A.

One or more cross-linking agents may be added, typically in amounts of about 1% to about 5% by weight of the coating composition, preferably about 2% to about 4% by weight of the coating composition. Cross-linking agents that may be used include aziridine, such as polyfunctional aziridine, carboiimides, isocyanates, such as water soluble isocyanates, silanes, multivalent cation solutions and organometallic compounds and the like and combinations thereof. Examples of cross-linking agents that may be used in the invention include polyfunctional aziridines available from BAYER® Corporation, Pittsburgh, Pa., U.S.A. ("BAYER") under the trade name XAMA® 7 and CX-100 available from DSM, carbodiimide available from Nisshimbo Industries Inc., Toyko, Japan under the trade name CARBODILITE® E-02, water dispersible iscoyanate from BAYER® available under the trade name BAYHYDUR® 302, COATOSIL® 1770 and Silane A-187 silanes available from Momentive Performance Materials, Albany, N.Y., U.S.A., Zinc Ammonium Carbonate multivalent cation solution available from Chemcor Chemical Corp, Chino, Calif., U.S.A. and organometallic compounds available from DuPont, Wilmington, Del., U.S.A. under the trade name TYZOR®.

The water based coating composition may further comprise optional binders. These binders include acrylic resin like NEOCRYL® resins available from DSM, in particular NEOCRYL® BT-100, polyurethane dispersions, like DISPERCOLL® U-53 available from BAYER and SANCURE® 1511 available from Lubrizol Advanced Materials Inc., Wickliffe, Ohio, U.S.A., vinyl acetate copolymers, like VINNAPAS® 405 available from Wacker Chemie AG, Munich, Germany ("Wacker"), halogen containing copolymers, like VINNOL® 4514 available from Wacker and HALOFLEX® 202 available from DSM and the like, and combinations thereof.

The water based coating composition may also comprise flow promoters such as surfactant and/or solvent to improve the flow and wetting of the water based coating composition. Preferably from about 0.05% to about 20% flow promoter by weight of the coating composition, typically about 14% to about 18% by weight of the coating composition, is used. Typical surfactants useful in the invention include sodium dioctyl sulfosuccinate like AEROSOL® OT available from Cytec Industries Inc., West Paterson, N.J., U.S.A., SURFYNOL® 420 available from Air Products and Chemicals Inc., Allentown, Pa., U.S.A. which is a blend of ethoxylated 2,4,7,9-tetramethyl-5-decyn-4,7-diol and 2,4,7,9-tetramethyl-5-decyne-4,7-diol, DISPONIL® AFX 3070 available from Cognis, Duesseldorf, Germany which is an aqueous solution of modified fatty alcohol polyglycol ether and the like and combinations thereof. Solvents useful in the invention include monobutyl ether of dipropylene glycol, monomethyl ether of dipropylene glycol, monobutyl ether of ethylene glycol, monobutyl ether of diethylene glycol, butyrolactone, dibasic esters, lactate esters, N-alkyl pyrollidones, alcohols, ketones, and the like and combinations thereof.

In addition, the coating composition may comprise adhesion promoters within the water based coating composition. Useful adhesion promoters include polyurethanes such as, NEOREZ® R-600 available from DSM, acrylics like NEOCRYL® A6015 available from DSM, PURETHANE™ C-3724 available from Ashland Inc., Dublin, Ohio, U.S.A. ("Ashland"), vinyl acetate copolymers such as VINNAPAS® 410 available from Wacker and the like and combinations thereof.

Other materials can be incorporated into the water based coating composition. Such materials include thickeners, antifoaming agents, flocculents, slip additives, wax additives and optical brighteners.

Although not wishing to be bound by any theory, the inventors believe that the ability of the water based coating composition to provide a matte finish after application to a base substrate results, at least in part, by the inclusion of a matte polymer dispersion made by controlling the particle size distribution within the water based coating composition as the water based coating composition is being formed. Thus, the water based coating composition may comprise a polymer with a particular particle size distribution, or range of particle size distributions that results in the matte properties of the water based coating composition. The water based coating composition provides a matte surface after application on the base substrate that has lower gloss and better low gloss and rub and scratch resistance than conventional low gloss or inherently matte coating compositions.

The matte substrate comprises the water based coating composition and a base substrate. The water based coating composition is generally applied to the base substrate using typical graphic arts application methods such as gravure, flexo, rod, slot die and the like. For example, the water base, such as the polyurethane dispersion, cross-linking agent, optional binder and other materials may be applied to the base substrate using these methods to form the matte substrate. Application rates (i.e. coating weights) are generally less than or equal to about 3 dry pounds of water based coating composition per about 3,000 square feet of base substrate, preferably less than or equal to about 2.40 dry pounds of water based coating composition per about 3,000 square feet of base substrate and typically less than or equal to about 2.25 dry pounds of water based coating composition per about 3,000 square feet of base substrate. The application rates (i.e. coating weights) may be from about 1 to about 3 dry pounds of water based coating composition per about 3,000 square feet of base substrate, preferably about 1 to about 2.4 dry pounds of water based coating composition per about 3,000 square feet of base substrate and typically from about 1 to about 2.25 dry pounds of water based coating composition per about 3,000 square feet of base substrate including about 1 dry pound to about 2 dry pounds of water based coating composition per about 3,000 square feet of base substrate. In a particular embodiment the application rate (i.e. coating rate) may be about 2 dry pounds of water base coating composition per about 3,000 about square feet of base substrate.

In embodiments no mineral filler, refractory filler and/or organic filler are used or applied, however, the water based coating composition may comprise small amounts of mineral filler, refractory filler and/or organic filler, such as less than about 1.0%, typically less than about 0.75%, such as less than about 0.5%, including less than about 0.1%. In embodiments where mineral filler, refractory filler and/or organic filler are used, these materials may be in amounts of from about 0.05% to about 1.0%, such as about 0.1% to about 0.8%, typically about 0.25% to about 0.75%. In certain embodiments, the amount of mineral filler, refractory filler and/or organic filler may be from about 0.05% to about 0.45%. No other additional matting agents, such as chemical, composition, or material that will enhance a low gloss or dull finish to the appearance of the coated substrate, are used in the water based coating composition or in making the matte substrates. Examples of mineral, refractory or organic fillers that may be used in the invention include silica (such as Lovel 27 from PPG Industries, Pittsburgh, Pa., U.S.A.), alumina trihydrate (such as HYDRAL® 710 from Almatis, Frankfurt, Germany), urethane beads (such as DECOSOFT® 15T from DSM), melamine or urea formaldehyde beads (such as PERGOPAK® M3 from Albemarle Corporation, Richmond, Va., U.S.A.), polyamide beads (such as ORGASOL® 2001 UD Nat 2 from Arkema Inc., Philadelphia, Pa., U.S.A.) and the like, and combinations thereof.

In certain embodiments, the gloss may be adjusted by the addition of gloss enhancers to the water based coating composition or the use of resins or materials, such as particular polyurethane dispersion materials which may provide more gloss than other materials. For example, the NEOREZ® R-989 product when used in the water based coating composition will provide a higher gloss matte substrate than use of the NEOREZ® R-1010 product. Other gloss enhancers useful in the invention include styrene acrylic, like LUCIDENE® 615 available from Hydrite, Brookfield, Wis., U.S.A., acrylic resins, like NEOCRYL® A6015 available from DSM, vinyl acrylic, vinyl acetate, vinyl acetate ethylene and the like and combinations thereof.

The base substrate used in the invention may be any type of substrate material generally used for coated substrates. For example, the base substrate is typically selected from the group consisting of polyamide, polyester, polypropylene, polyethylene, polyvinyl chloride (PVC), styrene, foil, paper, paperboard and combinations thereof. The base substrate may have a thickness of about 0.02 mil to about 25 mil, although other thicknesses are within the scope of the invention. Typically, the base substrate will have a surface energy greater than about 38 dynes/cm$^2$, although base substrates with lower surface energy may be used. Examples of base substrates that may be used include CAPRAN® polyamide available from Honeywell, Morris Township, N.J., U.S.A., LUMIRROR polyester available from Toray Plastics (America) Inc., Fort Royal, Va., U.S.A., MYLAR® and MELINEX® polyester available from DuPONT TEIJIN FILMS™, Hopewell, Va., U.S.A., BICOR® and SYN-CARTA® polypropylene available from ExxonMobil Chemical, Baytown, Tex., U.S.A. and GRX and AQS polypropylene available from AET Films, New Castle, Del., U.S.A.

The base substrates are a generally planar materials having first and second sides with relatively little thickness. The water based coating composition is applied to one or more sides of the base substrate, typically one side of the base substrate. The coating may remain on one side of the base substrate and dry to create a matte substrate having a first side with a matte finish attributable to the water based coating composition and a second side that is not matte attributable to the water based coating composition but has the characteristics of the base substrate. The water based coating composition may also wet out the base substrate forming a matte substrate with a matte finish on both sides attributable to the coating material creating a matte surface on one or both sides of the base substrate. Likewise, the water based coating composition may be applied to both sides of the base substrate. A method for making a matte substrate comprises a) providing the water based coating composition described herein comprising a polyurethane dispersion, up to about 1.0% mineral fillers, refractory fillers, or organic fillers and one or more cross-linking agents, b) providing a base substrate having at least one surface and c) applying the water based coating composition to at least one of the surfaces of the base substrate at a coating weight of less than about 3 dry pounds of the water based coating composition per about 3,000 square feet of the base substrate. The water based coating composition may be applied in step c) of the method in one coating application, that is all of the necessary water based coating composition may be applied in one coat, or the water based coating composition may be applied in one or more, or more than one, coating applications.

In embodiments, depending on the nature of the substrate, a first down adhesion promoting layer is necessary for proper adhesion of the water based coating composition. Accordingly, the method of applying the water based coating composition to the substrate may include applying a first down adhesion promoting material as a layer to the base substrate prior to applying the water based coating composition. The first down adhesion promoter may be selected from polyethylenimine (POLYMIN® P available from BASF), polyurethane dispersion (NEOREZ® R600 available from DSM), cationic acrylics (Ottopol KX-99 available from Gellner Industrial LLC, Hometown, Pa., USA) and copolymer dispersions (MICHEM® PRIME 4983 and MICHEM® PRIME 4990 available from MICHELMAN®, Cincinnati, Ohio, U.S.A.), and the like and combinations thereof. Typical dry coating weights of the first down adhesion promoter are from about 0.1 to about 1.5 dry pounds per 3,000 square feet of base substrate, including from about 0.5 to about 1.2 dry pounds per 3,000 square feet of the base substrate, with the water based coating composition then applied over the first down adhesion promoter layer at the coating weights discussed herein. In embodiments wherein a first down adhesion promoting material is applied, such material is applied to the first and/or second side(s) of the base substrate prior to the application of the water based coating material.

The matte substrates in accordance with the invention will have a 60° gloss less than about 20, preferably less than about 10, such as less than about 5. In embodiments, the matte substrates will have a 60° gloss of less than or equal to about 1.

The matte substrates may be laminated to another material (i.e. a second material) in a post coating operation. For example, the matte substrate may have a thermal heat sealing layer applied to one side of the base resin, typically to the side of the base resin opposite to that which was coated, particularly in embodiments where the water based coating composition coats only one side of the base substrate. The matte substrate may also have an adhesive, such as a pressure sensitive adhesive or wet bond adhesive, applied to one or both sides of the matte substrate, typically a side which does not comprise the coating from the water based coating composition.

The matte substrates may be used as over laminate on over laminated substrates, such as metal, wood, paperboard, paper and plastic substrates and the like, and may be over laminates applied to other printed substrates, for example, over laminates applied to book covers, magazine covers, folder covers and the like. Typically, the matte substrates are writable with a writing instrument, such as a pencil, or ball point pen and are adhesive to water base, solvent base, radiation curable, oxidative oil based lithographic inks, topcoats, paints, and the like. Also, the matte substrates are adhesive to laser and photo copier toners.

Coatings and other materials may be applied onto the coated surface such that the matte substrate comprising the water based coating composition may further comprise an overcoat, such as an overcoat water base (which may different or the same as the water base dispersion in the water based coating composition), solvent, energy curable materials and the like and combinations thereof. For example, UV curable gloss topcoats can be applied to the coated surface and such topcoats have excellent flow, wetting, and adhesion to the water based coating material.

The matte substrates comprising the coating compositions described herein have excellent scratch and mar resistance and any damage from scratching and marring will be self healing. Self healing substrates are such that any mars or scratches experienced by the coating composition on the matte substrate will decrease completely or partially over time, typically a short period of time, for example less than about 24 hours, such that the mar or scratch no longer appears visible. Without being bound by any theory, the inventors believe that the water based coating composition although crosslinked in its matrix remains thermoplastic and thus when the water based coating composition is disturbed by an impact causing a mar or scratch in the coating, the coating composition will flow over time and completely or partially fill in the void temporarily left by the action causing the mar or scratch.

Further, the matte substrates have excellent flexibility and will lay flat with no curl, i.e. will not curl the base substrate, which provides exemplary properties to the coated matte substrate. The matte substrate typically has soft touch feel. Also, the matte substrates have UV topcoat adhesion, excellent adhesion to the base film, resistance to washing by common household cleaners and excellent heat resistance.

The water based coating compositions provide processing benefits in making matte substrates. The coating may applied to the base substrate in lower coat weights compared to conventional coating materials. For example, prior art coatings typically are applied at heavy coat weights and use more mineral filler, refractory filler and/or organic filler matting agents and/or other matting agents compared to the invention. In embodiments of the invention, the water based coating composition comprises either low amounts or no, added mineral or non mineral matting agents, i.e. mineral filler, refractory filler and/or organic filler, yet a 60° gloss less than about 1 can be achieved at relatively low coating weights, such as less than about 9 wet pounds (about 3 dry pounds), including less than about 6.5 wet pounds (about 2.08 dry pounds), of water based coating composition per about 3,000 square feet base substrate. This results in less energy use to evaporate volatile material compared to conventional coatings, allows for lower oven temperatures such that heat sensitive base substrates, like heat sensitive films, can be used which may allow faster and lower cost processing.

EXAMPLES

Examples 1-8

Examples 1-4 and 6 are formulated in accordance with the invention described herein comprising a polyurethane dispersion in the water based coating. Example 5 in which the water base contains only a matte acrylic dispersion, and Example 7 in which a styrene acrylic dispersion is used are comparative. Example 8 is also comparative and provides testing results for a commercially available coated matte film (substrate).

The raw materials for each of Examples 1-7 as specified in the table were added to a suitable container while mixing. Water was added as necessary to adjust viscosity to 30-35 Seconds in a Number #2 Zahn cup following standard ASTM D4212-88, which is incorporated herein by reference in its entirety. The resulting water based coating composition for each example was then applied to polyamide base substrates as discussed below.

For each of Examples 1-7 bare clear polyamide films were mounted on white solid bleached sulfite board ("SBS") using adhesive tape. The water based coating composition for each of the examples was applied to the polyamide films using a direct gravure laboratory hand proofer from Harper Corp. using a ceramic 200 line 8.16 BCM cylinder with a doctor blade. Each polyamide film used for the examples was mounted on a flat surface. The proofer was then tilted to the 45° position, the water based coating composition was then applied directly onto the anilox roll with the doctor blade, subsequently the proofer was repositioned to about a 20° to about a 30° position and then the proofer is pulled towards the operator. The drawdowns were then dried at about 140° F. for about 5 minutes in a forced air oven. The coating weights for these examples was about 1.2 to about 1.8 dry pounds of water based coating composition per 3,000 square feet base substrate.

The drawdown samples for each of Examples 1-7 were allowed to equilibrate overnight in the open air in the laboratory before testing. The test results for each example are set forth in Table 1.

Scratch resistance testing was performed subjectively by using finger nails to scratch the surface of the dry film for samples of each example. Self healing was evaluated by watching the scratches and damage made in the coating during the scratch resistance tests over time and seeing if the damage appears to become less and less. Soft touch feel for

TABLE 1

| Examples Matte Substrate | Example #1 | Example #2 | Example #3 | Example #4 | Example #5 | Example #6 | Example #7 | Example 8 - Conventional Matte Coated Polyamide film |
|---|---|---|---|---|---|---|---|---|
| Raw Materials | | | | | | | | |
| NEOREZ ® R-1010 Matte PUD | 100 | 100 | 83.3 | 80 | | | | |
| XAMA ®-7 Aziridine | | 3 | 3 | 3 | 3 | | 3 | |
| NEOCRYL ® BT-100 Acrylic Emulsion | | | 16.7 | | | | | |
| NEOREZ ® R-989 Clear PUD | | | | 20 | | | | |
| NEOCRYL ® A2082 Matte Acrylic Dispersion | | | | | 100 | | | |
| Quaker Color DM-1114 Matte PUD | | | | | | 100 | | |
| Styrene Acrylic Emulsion | | | | | | | 95 | |
| Silica Matting Powder | | | | | | | 5 | 95 |
| Unknown Resin Binder | | | | | | | | 5 |
| Tests and Results on Polyamide Film | | | | | | | | |
| 60 Degree Gloss on Un-Laminated Film | 8 to 9 | 8 to 9 | 7 to 8 | 19 to 21 | 19 to 21 | 13 to 14 | 19 to 21 | 7 to 8 |
| 60 Degree Gloss on Laminated Film | No Data | 0.7 to 0.8 | 0.9 to 1.5 | No Data | No Data | No Data | No Data | 2.6 to 2.7 |
| Adhesion | Good | No Failure | No Failure | Good | Good | No Failure | Poor | No Failure |
| Scratch and Burnish Resistance | Fair | Excellent, Very slightly worse versus Standard | Very good, Slightly worse versus Standard | Good | Fair | Equal to Standard | Poor | Standard Excellent, almost no damage |
| Soft Touch Feel | Excellent | Good | Good | Good | None | None | None | None |
| Dry Film Surface Tension (Dyne/CM$^2$) | 50+ | 50+ | 50+ | No Data | No Data | No Data | 36 | 50+ |
| Flow and Leveling | Fair | Fair | Equal to Standard | Fair | Poor | Fair | Poor | Excellent Standard |
| Self Healing | Excellent | Very Good | Very Good | Very Good | None | None | None | None |
| Adhesion off UV Topcoats | Excellent | Excellent | Excellent | No Data | No Data | No Data | Good | No Adhesion |
| Ball Point Pen Writable | Excellent | Excellent | Excellent | Excellent | Excellent | Excellent | Excellent | Excellent |

Gloss was measured using a BYK Gardner Micro gloss meter at 60 degrees in accordance with manufacturer's instructions. Gloss was measured on un-laminated film samples from each example which comprised lab drawdown samples taped to white SBS.

Laminated samples of Examples 2 and 3 were tested for gloss. For these laminated film samples water based coating from Examples 2 and 3 had a heat seal applied to the back side and then were laminated by heat and pressure to black printed SBS. Gloss of the commercially available film (Example 8) was also measured using a BYK Gardner Micro gloss meter at 60° in accordance with manufacturer's instructions.

Dry film surface tension was tested by applying conventional wetting tension standard solutions to drawdown samples for Examples 1-3 and 7, and also to the commercially available film of Example 8. Adhesion for each example was determined by applying a known modified (3M) version of the ASTM D3359-08 test method for measuring adhesion by tape. ASTM D3359-08 is incorporated herein in its entirety by reference.

samples of the examples was also determined by touching the films and then subjectively evaluating the soft feel.

Flow and leveling were evaluated by visual inspection of the wet coating for each of Examples 1-7 after the coating was applied and as the coating dried. The conventional film (Example 8) was also studied.

Adhesion of UV topcoats was determined in the following manner. Four gloss topcoats (ST311, ST32, ST31 P and 18649 from Ashland) were applied to the dry matte coated films in accordance with standard procedures. The topcoats were applied to Examples 1-3 as well as Example 7 and to the commercially available film (Example 8) for comparative purposes. The liquid UV coatings were cured with UV light as required. The adhesion of the cured UV topcoats to the matte coated film was tested by tape adhesion and fingernail scratch adhesion/resistance.

Ball point pen writeability was tested by writing on the dry matte coated film for each example with various types of ball point pens. All of the examples of the invention and comparative examples were able to be written on with the ball point pens.

We claim:

1. A matte substrate comprising
   a) a dried film formed from a water based coating composition comprising
      a water base consisting of the combination of (a) a polyurethane dispersion, wherein the polyurethane dispersion comprises a water based aliphatic urethane, carboxyl or sulfonate functionality and less than about 2% N methyl pyrrolidone and (b) a binder comprising an acrylic resin; and
      one or more cross-linking agents; and
   b) a base substrate having a thickness of about 0.02 mil to about 25 mil selected from the group consisting of polyamide, polyester, polypropylene, polyethylene, polyvinyl chloride, styrene, foil, paper, paperboard and combinations thereof, wherein the matte substrate has a 60° gloss less than about 20;
   wherein part a) is absent the addition of a mineral filler, refractory filler, organic filler, or combinations thereof.

2. The matte substrate of claim 1 wherein the one or more cross-linking agents are selected from the group consisting of aziridine, carboiimides, isocyanates, silanes, multivalent cation solutions, organometallic compounds and combinations thereof.

3. The matte substrate of claim 1 wherein the water based coating composition further comprising flow promoters, adhesion promoters or gloss enhancers.

4. The matte substrate of claim 1 wherein the water based coating composition further comprising a material selected from the group consisting of thickeners, antifoaming agents, flocculents, slip additives, wax additives and optical brighteners.

5. The matte substrate of claim 1 wherein the base substrate has a surface energy greater than about 38 dynes/cm$^2$.

6. The matte substrate of claim 1 comprising a first down adhesion promoter layer having a first down adhesion promoter.

7. The matte substrate of claim 1 made by applying the water based coating composition to the base substrate at a coating weight of less than or equal to about 3 dry pounds of the water based coating composition per about 3,000 square feet of the base substrate.

8. The matte substrate of claim 7 wherein the coating weight is less than or equal to about 2.4 dry pounds of the water based coating composition per about 3,000 square feet of the base substrate.

9. The matte substrate of claim 1 wherein the water based coating composition does not curl the base substrate.

10. The matte substrate of claim 1 wherein the water based coating composition has soft touch.

11. The matte substrate of claim 1 wherein the water based coating composition is self healing.

12. The matte substrate of claim 1 comprising printing on the dried film of the water base coating composition.

13. The matte substrate of claim 1 comprising a dried film of an overcoat wherein the overcoat comprises one selected from the group consisting of an overcoat water base, an energy curable material and combinations thereof.

14. A laminated material comprising the matte substrate of claim 1 and a second material.

15. The laminated material of claim 14 wherein the second material is thermal heat sealing layer or an adhesive.

16. An over laminate material comprising the laminated material of claim 14 and an over laminated substrate.

17. The over laminate material of claim 16 wherein the over laminated substrate is selected from the group consisting of metal, wood, paper, paperboard and plastic.

18. A cover material comprising the over laminate of claim 16 and a printed substrate.

* * * * *